United States Patent [19]

Grochowski et al.

[11] Patent Number: 5,555,423
[45] Date of Patent: Sep. 10, 1996

[54] MULTI-MODE MICROPROCESSOR HAVING A PIN FOR RESETTING ITS REGISTER WITHOUT PURGING ITS CACHE

[75] Inventors: Edward T. Grochowski, San Jose, Calif.; Peter D. MacWilliams, Aloha, Oreg.

[73] Assignee: Intel Corporation, Santa Clara, Calif.

[21] Appl. No.: 507,715

[22] Filed: Jul. 26, 1995

Related U.S. Application Data

[63] Continuation of Ser. No. 962,047, Oct. 16, 1992, abandoned, which is a continuation of Ser. No. 794,584, Nov. 19, 1991, abandoned.

[51] Int. Cl.⁶ .................................................. G06F 9/46
[52] U.S. Cl. ..................... 395/775; 395/493; 395/800; 364/DIG. 1; 364/232.8; 364/232.9; 364/243.4
[58] Field of Search ..................................... 395/445, 450, 395/453, 470, 493, 733, 734, 735, 775, 800

[56] References Cited

U.S. PATENT DOCUMENTS

| | | | |
|---|---|---|---|
| 4,435,068 | 3/1984 | Landa | 355/3 R |
| 4,458,310 | 7/1984 | Chang | 395/446 |
| 4,628,448 | 12/1986 | Murao | 395/800 |
| 4,677,548 | 6/1987 | Bradley | 395/800 |
| 4,779,187 | 10/1988 | Letwin | 395/742 |
| 4,829,472 | 5/1989 | McCourt et al. | 364/419 |
| 4,901,283 | 2/1990 | Hanbury et al. | 365/222 |
| 4,958,302 | 9/1990 | Fredrickson et al. | 364/521 |
| 5,007,027 | 4/1991 | Shimoi | 365/229 |
| 5,088,026 | 2/1992 | Bozman et al. | 395/403 |

FOREIGN PATENT DOCUMENTS 0197552 10/1986 European Pat. Off. .

OTHER PUBLICATIONS

Dave Bursky "80X86–Compatible Family Outperforms Original CPUs," Electronic Design, pp. 53–56, p. 61 (Sep. 26, 1991).
Andrew C. Staugaard, Jr., "How to Program and Interface the 6800, pp. 154–157," 1980.
M. Morris Mano, "Computer System Architecture", pp. 261–263, (2nd ed.), 1982.
Motorola, M C68020 32–Bit Microprocessor User's Manual, pp. 5-41–5-42, 1984.
Zilog, 280 Family Data Book, p. 3, 1989.
Intel Corporation, "Microprocessors", vol. I, p. 2–14, (1991).

Primary Examiner—Lance Leonard Barry
Attorney, Agent, or Firm—Blakely, Sokoloff, Taylor & Zafman

[57] ABSTRACT

In a high performance multi-mode microprocessor, apparatus and a method for switching between modes while selectively maintaining the contents of selected memory elements inside the microprocessor, including a cache and floating point registers. The microprocessor described herein includes an electrical pin provided externally on the microprocessor chip package, that is connected to a control unit, which is connected to a plurality of registers. Microcode is provided, accessible to the microprocessor, that re-initializes some, but not all, of the microprocessor's registers and caches to their initial state, so that the microprocessor is placed in its initial mode of operation. In operation, the pin is actuated by an electrical signal provided from any of a number of conventional sources, such as an I/O port. Actuation of the pin in turn actuates the control unit, to assert a high priority interrupt. When the interrupt is recognized, the control unit, using the microcode means, selectively re-initializes many of the microprocessor's registers while specifically maintaining the contents of the cache and the floating point registers.

12 Claims, 4 Drawing Sheets

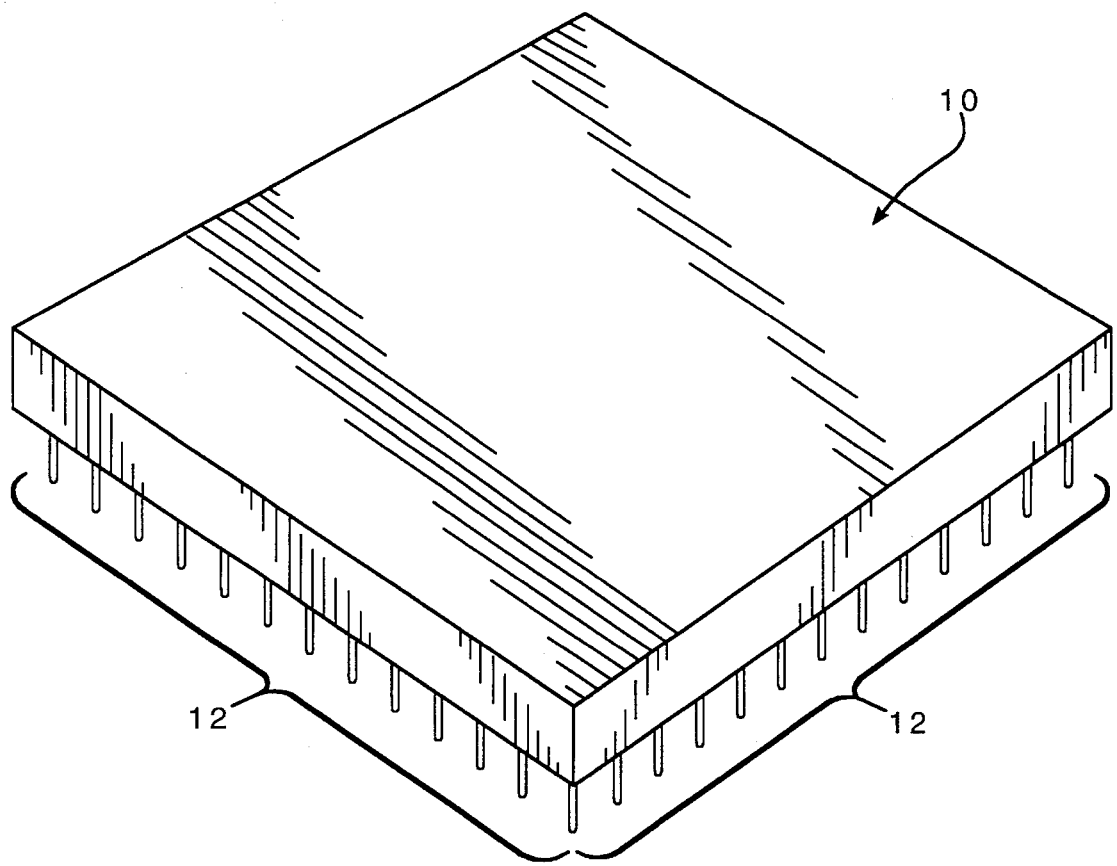
FIG_1

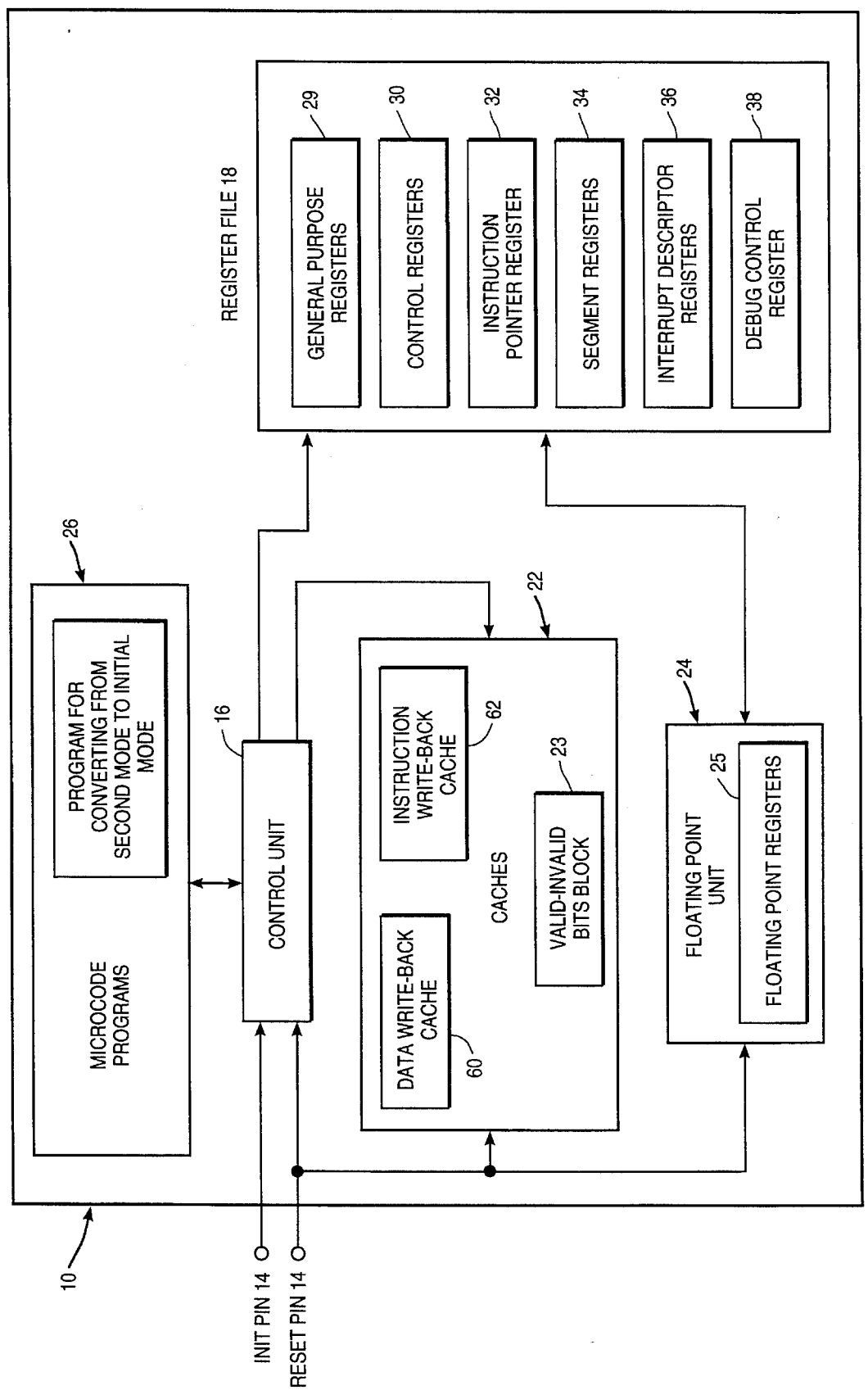
FIG_2

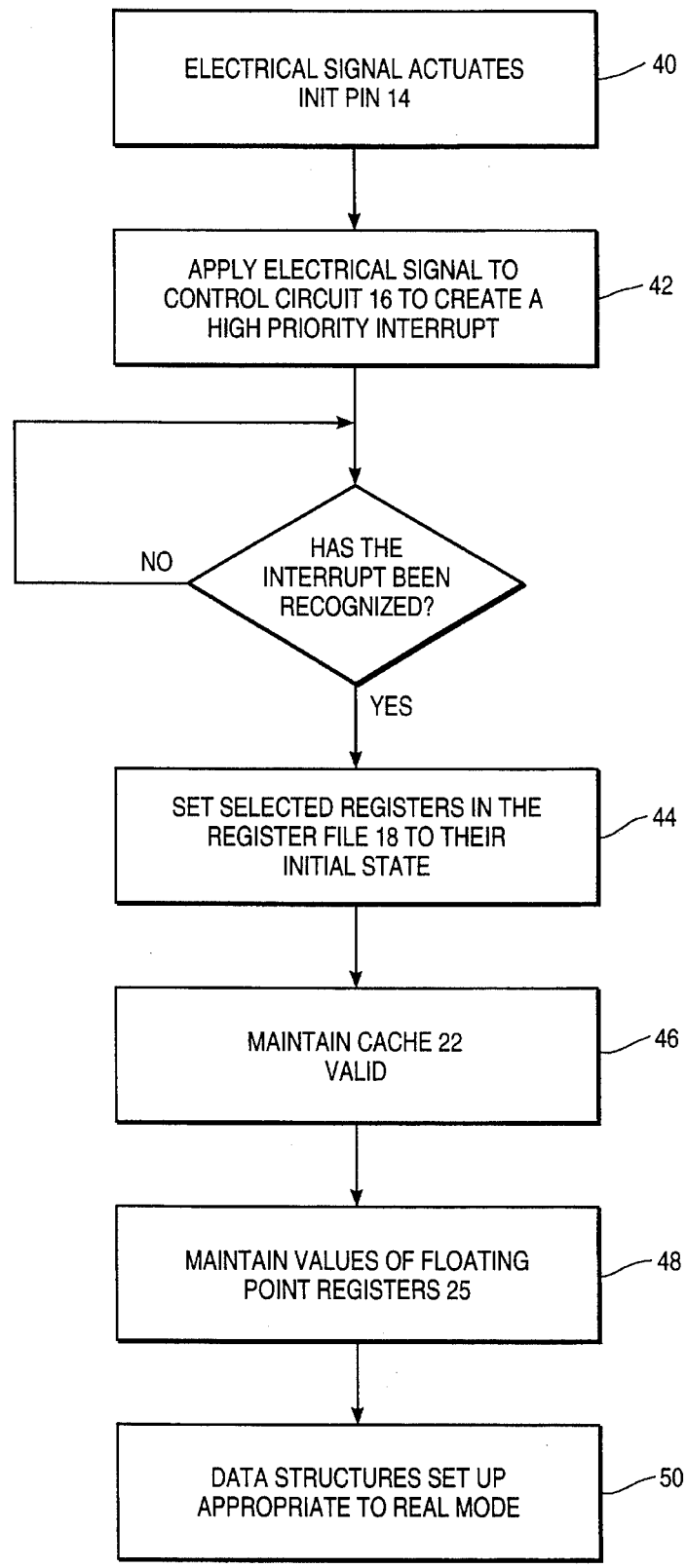

| REGISTER | INITIAL (OR RESET INITIALIZED STATE) | INIT RE-INITIALIZED STATE |
|---|---|---|
| CR0    —30 | 00000000H | 00000000H |
| EFLAGS | 00000002H | 00000002H |
| EIP    —32 | 0000FFF0H | 0000FFF0H |
| CS | 0F000H | 0F000H |
| DS | 0000H | 0000H |
| SS    —34 | 0000H | 0000H |
| ES | 0000H | 0000H |
| FS | 0000H | 0000H |
| GS | 0000H | 0000H |
| IDTR (BASE)    —36 | 00000000H | 00000000H |
| IDTR (LIMIT) | 03FFH | 03FFH |
| DR7    —38 | 0000H | 0000H |
| FLOATING-POINT UNIT REGISTERS 25 | | |
| | (IF SELF-TEST HAS BEEN INVOLKED) | VALUE PRIOR TO APPLYING SIGNAL TO INIT PIN 14 |
| CONTROL WORD | 037FH | |
| STATUS WORD | 0000H | |
| TAG WORD | 0FFFFH | |
| IP OFFSET | 00000000H | |
| DATA OPERAND OFFSET | 00000000H | |
| CS SELECTOR | 0000H | |
| OPERAND SELECTOR | 0000H | |
| OPCODE | 000H | |
| CACHE 22 | | |
| VALID/INVALID BIT 23 | -INVALID- CACHE CONTENTS UNDEFINED | -VALID- CONTENTS SAME AS THAT PRIOR TO APPLYING SIGNAL TO INIT PIN 14 |

FIG_4

MULTI-MODE MICROPROCESSOR HAVING A PIN FOR RESETTING ITS REGISTER WITHOUT PURGING ITS CACHE

This is a continuation of application Ser. No. 07/962,047, filed Oct. 16, 1992 now abandoned which is a continuation of application Ser. No. 07/794,584, filed Nov. 19, 1991 now abondandoned.

BACKGROUND OF THE INVENTION

1. Field of the Invention

The present invention relates to microprocessors. More specifically, the present invention relates to microprocessors that have more than one mode of operation, and switch between the modes to accommodate software designed for one of the modes.

2. Description of Related Art

Microprocessor technology has evolved rapidly over the past decade. Microprocessors that were considered advanced ten years ago have been successively supplanted by several new generations of microprocessors. The new generations of microprocessors are much more powerful than the older generations, having greatly expanded functions and capabilities, and much faster operating speeds. Software written for the new microprocessors can take advantage of many of the new functions; however, older and less complex software written for previous generations of microprocessors is still in common use and commercially available. Most computer users do not want to discard their old software whenever the manufacturer develops a new model, and in fact, there may be advantages to using the old method of operation for some special purposes. Thus, microprocessor designers typically design their new microprocessors to be compatible with older software.

In order to ensure that older software can run on newer microprocessors, some manufacturers design the microprocessor with several available modes, with at least one of the modes having the operational characteristics of the earlier microprocessor. For example, the INTEL corporation manufactured the original 8086 microprocessor a number of years ago. Since then, this microprocessor has evolved progressively into the 80286, the i386™, and then the i486™ microprocessors. These later generation microprocessors have several available modes of operation. In order to provide compatibility with programs written for the 8086 microprocessor, the later generations can operate in a "real-address" mode, typically called the real mode, that has the operational characteristics and the data structures of the 8086 microprocessor, as well as in other modes, such as a "protected" mode in which the newer microprocessor's capabilities can be more fully utilized with greater operational capabilities and different data structures.

For some types of software, it is useful to switch between modes of operation during program execution. An example of a program that switches between the protected mode and real mode is a memory manager. The memory manager may begin operation in the real mode, switch to the protected mode at some point in its operation to access data with an address over 1 Megabyte, copy blocks of data, and then return to the real mode for further processing.

Upon start-up, the registers of the 8086 microprocessor and its progeny are initialized to the real mode configuration by microcode. After initialization, software is executed which sets up data structures appropriate to the real mode. However, if instead of the real mode, the application software uses the protected mode, then that software sets a flag enabling the protected mode's capabilities. The program then sets up the data structures appropriate to the protected mode, and switches the microprocessor to the protected mode of operation. The designers of the 80286 microprocessor did not envision anyone wanting to switch from the protected mode to the real mode; and therefore no provision was made for this type of switching. In other words, the architecture of the 80286 microprocessor did not support switching from the protected mode to the real mode.

However, some computer manufacturers using the 80286 microprocessor, such as IBM, wanted a capability to switch from the protected mode to the real mode, and developed a method to accomplish the switch by including another device that asserted the reset pin in order to reset and re-initialize the microprocessor as if it had just started up. However, there are some problems associated with simply asserting the reset pin. In later microprocessors that include additional features like an internal cache and an internal floating point unit, such as the i486™ microprocessor, asserting the reset pin also re-initializes the cache, thereby destroying the contents of the cache memory. Furthermore, the contents of the registers in the floating point unit (which was physically separate in the 8086, 80286, and i368™ microprocessor) were also re-initialized (and therefore destroyed) by a reset with self-test, although the floating point registers' contents were maintained by a reset without self-test.

The internal cache memory, which was first introduced in the i468™ microprocessor, is used in all modes of microprocessor operation: the real mode, the virtual 8086 mode, and the protected mode, among others. The cache includes memory, internal to the microprocessor, that speeds up processing of data and instructions by storing certain data and instructions recently retrieved from main memory. A purpose of the cache is to minimize retrieval time and write time for frequently used data and instructions. Caching may be divided into two types: write-through, or write-back. Write-back caches generally have greater performance in a microprocessor. Both types function similarly in reading data from them; however, when writing to them, write-through caching updates both the cache and main memory, while in write-back caching, the cache contents are updated without writing to main memory. In write-back caching, writing the updated results to main memory occurs only when specific operations are performed, for example when new cache lines are allocated after the cache is already full. Thus, if the contents of a write-back cache were to be re-initialized, the updated data would be lost unless it is written back to memory or saved elsewhere. Write-back caching, although more difficult to implement, is useful because it saves microprocessor time that would be wasted unnecessarily writing to main memory each time that the cache is updated. Furthermore, write-back caching minimizes the traffic on the bus, freeing the bus for other communications.

A problem arises if the reset pin is asserted in order to get to the real mode of operation, particularly if a write-back cache has been implemented in the microprocessor, for faster performance over a write-through cache. In a full reset, the cache is re-initialized and all its contents are lost, including any changes that were made. If the cache is the write-back type, these changes were not written to main memory, and therefore the contents of main memory would contain incorrect data, a result that is unacceptable. If the cache contents were written to memory in order to update memory with correct data, then a large performance degradation would occur. Substantial time would be lost in writing the contents of the entire cache. Furthermore, the loss of cache contents in re-initialization may cause a slowdown of operating speed because the re-initialized cache had contained frequently used data and instructions. Although not all of the cache information will be used; it is possible that a substantial portion of the cache would be used again. This cache would need to be refilled during the microprocessor's normal operations, a task that consumes substantial microprocessor time unnecessarily. For these and other reasons, it is desirable to leave the contents of the cache intact while switching between modes.

In summary, it would be an improvement to provide a microprocessor that can quickly and straightforwardly switch between the real mode and the protected mode, while retaining the contents of a write-back cache without the need to write the contents to memory. It would also be an improvement if the microprocessor could save the contents of the registers in the floating point unit for compatibility with microprocessors that utilize a separate floating point unit.

SUMMARY OF THE INVENTION

The present invention is applicable to microprocessors that have two or more modes of operation, including an initial mode to which the microprocessor is set upon start-up, and a second mode of operation that can be selected after start-up. The second mode of operation may include improvements over the initial mode, such as improvements in speed, efficiency and operational capabilities. A microprocessor in accordance with the present invention is compatible with earlier, less sophisticated versions of the microprocessor and the software written for it, yet it runs quickly.

The present invention provides a multiple-mode microprocessor with a fast, efficient capability for switching between modes, while selectively maintaining the contents of selected memory elements internal to the microprocessor. The maintained memory elements may include an internal cache and floating point registers. The microprocessor described herein includes an INIT pin provided externally on the microprocessor chip package that includes a control unit. The control unit is also connected to a plurality of registers, in a register internal to the microprocessor. Microcode is provided, accessible to the microprocessor, that provides instructions for re-initialization of some of the registers within the microprocessor, so that the microprocessor is placed in its initial mode of operation, such as the real mode, while selectively maintaining the contents of internal memory elements including the cache and the floating point registers.

In operation, the INIT pin is actuated by an electrical signal provided from any of a number of conventional sources, such as an I/O port. Actuation of the INIT pin in turn actuates the control unit, which accesses the microcode program. The control unit, using the microcode program, selectively re-initializes many of the microprocessor's registers while specifically maintaining the contents of the cache and the floating point registers.

The present invention provides a microprocessor and method for converting between an initial mode and a secondary mode of operation that may have a higher level of functionality. The initial mode may be a real-address (real) mode, as in the INTEL 8086 microprocessor, for running older software packages written for the 8086 microprocessor. The second mode may be a higher level mode, such as the protected mode of the i486™ microprocessor, having a more sophisticated architecture and greater capabilities than the real mode. In the context of INTEL microprocessors, the present invention provides advantages for computer manufacturers and users who desire compatibility with prior software and hardware systems that used the INTEL 8086 and its progeny. Specifically, the real mode is useful to those who wish to operate older less sophisticated software with an architecture similar to the original 8086 microprocessor. The INIT pin is particularly useful for compatibility with the IBM PC/AT. To a user, the effect of applying a signal to the INIT pin is a reset that causes the microprocessor to start-up in the real mode; however, unlike a normal reset, the cache contents are not re-initialized or changed in any way.

The present invention provides an advantage when used with a "write-back" cache. If the cache is a write-back cache that contains updated data that has not been saved in main memory, the present invention avoids the loss of time necessary to write the contents to main memory. The result is a microprocessor with higher performance.

In the described embodiment, the selected registers that are re-initialized may include the control register, the flags register, the instruction pointer register, the segment registers, the interrupt descriptor table registers, and the debug control register. In another step, a data structure is set up in a form appropriate to the initial mode. Throughout the mode-switching operations, the contents of the cache are left unchanged and intact. The microprocessor may also include a floating point unit with floating point registers, which are left unchanged in the mode-switching operation. This feature maintains compatibility with microprocessors that utilize a separate floating point unit which would not normally be affected by a full reset of the microprocessor.

As a further advantage, the INIT pin can be easily implemented, at low cost, in microprocessors that have initialization microcode therein. The initialization microcode can be utilized, either partially or in its totality, substantially without change; i.e., it is not necessary to write a completely new program. Only a relatively small amount of additional code is needed to call the initialization routines, and the need for additional space in the microcode is minimal. Thus, the INIT re-initialization can be implemented easily in microprocessors that already include reset firmware, with small additions. In one interpretation, the INIT re-initialization can be understood as a high priority interrupt that drastically affects certain registers in the microprocessor.

In summary, the present invention provides a low cost, efficient method for switching to the initial mode of operation. It is particularly useful for running existing software programs that utilize the initial mode of operation to execute their instructions.

BRIEF DESCRIPTION OF THE DRAWINGS

FIG. 1 shows a microprocessor chip package having a number of electrical pins mounted externally.

FIG. 2 is a block diagram of a microprocessor, according to the present invention, including an INIT pin, and illustrating the difference between connections of the INIT pin and the RESET pin.

FIG. 3 is a flow chart that shows the method of the present invention.

FIG. 4 is a table that shows the contents of selected registers and the cache following INIT re-initialization, and FIG. 4 also shows those registers' contents and the cache contents following a start-up, or RESET initialization.

DETAILED DESCRIPTION OF THE INVENTION

The invention can be understood by reference to the figures wherein like parts are designated with like numerals throughout.

FIG. 1 shows a conventional microprocessor chip package 10 having a plurality of external electrical pins 12 positioned thereon. Each of the electrical pins 12 has a specific function relating to operation of the microprocessor 10. The apparatus of the present invention includes at least one of these electrical pins.

The microprocessor 10 of the preferred embodiment operates in one of several modes, including a real-address (real) mode and a protected mode. These modes correspond to the modes of the i486™ microprocessor, available from INTEL Corp. of Santa Clara, Calif. Descriptions of the i486™ microprocessor are widely available in numerous publications, such as the i486™ Microprocessor Programmer's Reference Manual available from INTEL Literature Sales, P.O. Box 58130, Santa Clara, Calif. 95052-8130, which is incorporated herein by reference. In the preferred embodiment, the real mode is the initial mode to which the microprocessor 10 is initiated upon start-up, or equivalently, upon full reset, when the RESET pin is actuated. The protected mode includes numerous improvements in speed and operational abilities over the real mode.

FIG. 2 is a block diagram that shows an INIT pin 14, according to the present invention, and its interconnections with a control unit 16 and register file 18. FIG. 2 also shows a RESET pin 20, and its interconnections with the control unit 16, a cache block 22 including a valid/invalid bit 23 for each cache line, and a floating point unit 24 including floating point registers 25. The control unit 16 can access microcode 26 as needed for its operations. Typically, the microcode 26 includes programming needed for start-up operations, such as will be described, as well as for other operations. Conventionally, the microcode 26 may be provided in an internal ROM (Read-Only Memory) in the microprocessor 10, or in an external ROM.

The control unit 16 is connected to the register file 18, which include general purpose registers 29, control registers 30, an instruction pointer register 32, segment registers 34, interrupt descriptor table registers 36, and the debug control register 38. These registers and their functions are similar to those in the i486™ microprocessor, available from INTEL Corp. of Santa Clara, Calif.

In the preferred embodiment, the RESET pin 20 is hardware oriented; it is directly connected to the appropriate state elements 39, so that when RESET is asserted, each appropriate register is cleared almost immediately. In comparison, the INIT pin 14 is directly connected to the control unit 16, which controls operations within the microprocessor 10. When asserted, the INIT pin 14 performs a high priority interrupt within the control unit 16 after it is recognized.

FIG. 3 is flow chart that shows a flow of operations according to the method of the present invention, wherein the operational mode of the microprocessor 10 is switched to an initial mode (the "real" mode in the preferred embodiment). Beginning in an operation box 40, an electrical signal is applied to actuate the INIT pin 14. The electrical signal can be provided by any of a number of conventional devices, such as an I/O port in an IBM PC/AT, and the signal may be digital high or digital low. Next, in an operation box 42, an electrical signal is applied to the control circuit 16. An operational sequence is started, controlled by the control circuit 16, using a program in the microcode 26, wherein the registers in the register file 18 are set to their initial state, as illustrated in an operation box 44. The initial state for selected registers in the register file 18, for the preferred embodiment, is shown in a FIG. 4, which is a table showing specific registers and their initial state, for both INIT and RESET, in hexadecimal.

In the table of FIG. 4, it may be noticed that, for the registers 30,32,34,36,38, the INIT re-initialized state is identical to the RESET initialized state. In operation, the INIT re-initialization process accesses some of the microcode 26 that is programmed for RESET initialization. For the floating-point registers 25, a value is maintained that is identical to the value prior to applying the electrical signal to the INIT pin 14, unlike the RESET initialization state with self-test, wherein the floating point registers 25 are set to the specified state. Furthermore, for the cache 22, in the INIT re-initialization, the caches lines are maintained valid and the contents of the caches 22 remain undisturbed, unlike the RESET initialization which sets the contents invalid. For purposes of reference, it may be noticed that the initial state for RESET is identical to that of the i486™ microprocessor.

Referring again to FIG. 3, the flow chart of the INIT re-initialization process, an operation box 46 shows that the contents of the cache 46 are maintained valid, and an operation box 48 shows that the values in the floating point registers 25 are also maintained valid. Finally, in an operation box 50, data structures are set up that are appropriate to the real mode. The microprocessor 10 is now set to operate in the real mode.

As implemented in the preferred embodiment, the INIT re-initialization can be understood as a high priority interrupt that drastically affects certain registers in the microprocessor 10. Specifically, the microcode sequence 54 accesses some, but not all of the initialization microcode 56 that is normally used for RESET initializations. Thus, the INIT re-initialization microcode program 54 can be implemented utilizing RESET microcode program 56 already provided therein, with some additional control microcode programming. It may be noted that, in the preferred embodiment, since the INIT re-initialization acts as a high priority interrupt, the processor may not recognize it instantly; i.e., some time elapses between the actuation of the INIT pin 14 and when it is recognized by the control unit 16.

In the preferred embodiment, the caches 22 are of the "write-back" type of cache as opposed to a "write-through" cache. As discussed in the background section of this document, both types of caches function similarly in reading data; however, when writing, a write-through cache updates both the cache and the main memory. In a write-back cache, the cache contents are updated without writing them to main memory. In write-back caching, writing the updated results to main memory occurs only when specific operations are performed, for example when new cache lines are allocated after the cache is already full.

The caches 22 in the preferred embodiment include a data cache 60 that stores frequently used data and a separate instruction cache 62 that stores frequently used instructions. In the preferred embodiment, the contents of both caches are maintained valid. For some applications, it may be sufficient to maintain only the contents of the data cache 60, and in other applications, it may be sufficient to maintain only the contents of the instruction cache 62. In other embodiments, the caches 22 may comprise only one cache for instructions and data, or, in still other embodiments, the caches 22 may comprise two or more caches.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. In a microprocessor having at least two modes of operation including an initial mode and a second mode, said initial mode being the mode to which the microprocessor is initialized upon start-up, an apparatus for transitioning from the second mode to the initial mode, said apparatus comprising:

a microcode memory means for storing microcode;

a control unit coupled to the microcode memory means for receiving and executing microcode that is stored in said microcode memory means and that controls the microprocessor, said control unit also for receiving interrupt signals;

a plurality of registers, coupled to the control unit, for storing register data;

an internal write-back cache, coupled to the control unit, for storing cache data;

a transition microcode program for unconditionally transitioning from the second mode to the initial mode while maintaining the validity of the contents of the internal write-back cache including means for re-initializing registers selected to place the microprocessor in its initial mode of operation;

an external electrical pin connected to the microprocessor and coupled to the control unit but not to the internal write-back cache and the plurality of registers, that, when asserted, asserts a high priority interrupt to the control unit, and the control unit includes means for halting the microprocessor and unconditionally executing the transition microcode program when said interrupt is recognized; and a reset pin coupled to the internal write-back cache and the plurality of registers for resetting the microprocessor by directly resetting the contents of said plurality of registers and invalidating the contents of the internal write-back cache.

2. The apparatus of claim 1, wherein the microprocessor further comprises floating point registers, and the transition microcode program further comprises means for maintaining the contents of said floating point registers.

3. The apparatus of claim 1, wherein said transition microcode program selectively re-initializes registers including a CR0 register, a EFLAGS register, an instruction pointer register, segment registers, interrupt descriptor table registers, and a debug control register.

4. The apparatus of claim 1, further comprising a second internal write-back cache, and furthermore, said transition microcode program includes means for not invalidating the second internal write-back cache.

5. The apparatus of claim 1 wherein the reset pin is coupled to the control unit, and said microcode memory further comprises an initialization microcode program, responsive to assertion of the reset pin, for initializing the microprocessor to the initial mode.

6. The apparatus of claim 5, wherein said reset microcode program includes routines that are utilized by the transition microcode program.

7. In a microprocessor having at least two modes of operation including an initial mode and a second mode, said initial mode being the mode to which the microprocessor is initialized upon start-up, an apparatus for transitioning from the second mode to the initial mode including reinitializing the contents of selected registers, said apparatus comprising:

a microcode memory means for storing microcode;

a control unit coupled to said microcode memory means for executing microcode stored in said microcode memory means;

a plurality of registers coupled to the control unit, said registers having an initial state that corresponds to the initial mode;

an internal write-back cache coupled to the control unit;

a selective re-initialization microcode program including microcode instructions to selectively re-initialize registers selected to place the microprocessor in its initial mode of operation while maintaining the validity of the contents of the internal write-back cache;

transition means for unconditionally transitioning from the second mode to the initial mode while maintaining the validity of the contents of the internal write-back cache, said transition means including
      an external pin coupled to the control unit to assert a high priority interrupt, and
      means, responsive to said high priority interrupt, for halting operation of the microprocessor and executing said selective re-initialization microcode; and reset means including a reset pin coupled to the internal write-back cache and the plurality of registers for resetting the microprocessor by resetting the contents of said registers and invalidating the contents of the internal write-back cache.

8. The apparatus of claim 7, further comprising floating point registers, and wherein said control unit maintains the contents of the floating point registers.

9. The apparatus of claim 7 wherein the reset pin is coupled to the control unit, and said microcode memory further comprises an initialization microcode program, responsive to assertion of the reset pin, for initializing the microprocessor to the initial mode.

10. The apparatus of claim 9, wherein said reset microcode program includes routines that are utilized by the selective re-initialization microcode program.

11. The apparatus of claim 7, wherein the selected registers that are re-initialized to their initial state include a CR0 register, a EFLAGS register, an instruction pointer register, and interrupt descriptor table registers.

12. The apparatus of claim 11, wherein the selected registers that are re-initialized further include segment registers and a debug control register.

* * * * *

UNITED STATES PATENT AND TRADEMARK OFFICE
CERTIFICATE OF CORRECTION

PATENT NO. : 5,555,423
DATED : September 10, 1996
INVENTOR(S) : Grochowski et al.

It is certified that error appears in the above-indentified patent and that said Letters Patent is hereby corrected as shown below:

In column 6 at line 20 delete "cache 22" and insert --caches 22--

In column 6 at line 21 delete "cache lines" and insert --cache line--

Signed and Sealed this

Twenty-first Day of January, 1997

Attest:

Attesting Officer

BRUCE LEHMAN

Commissioner of Patents and Trademarks